(No Model.)
M. SCHLATTER.
FLOOR CLAMP.
No. 528,033. Patented Oct. 23, 1894.
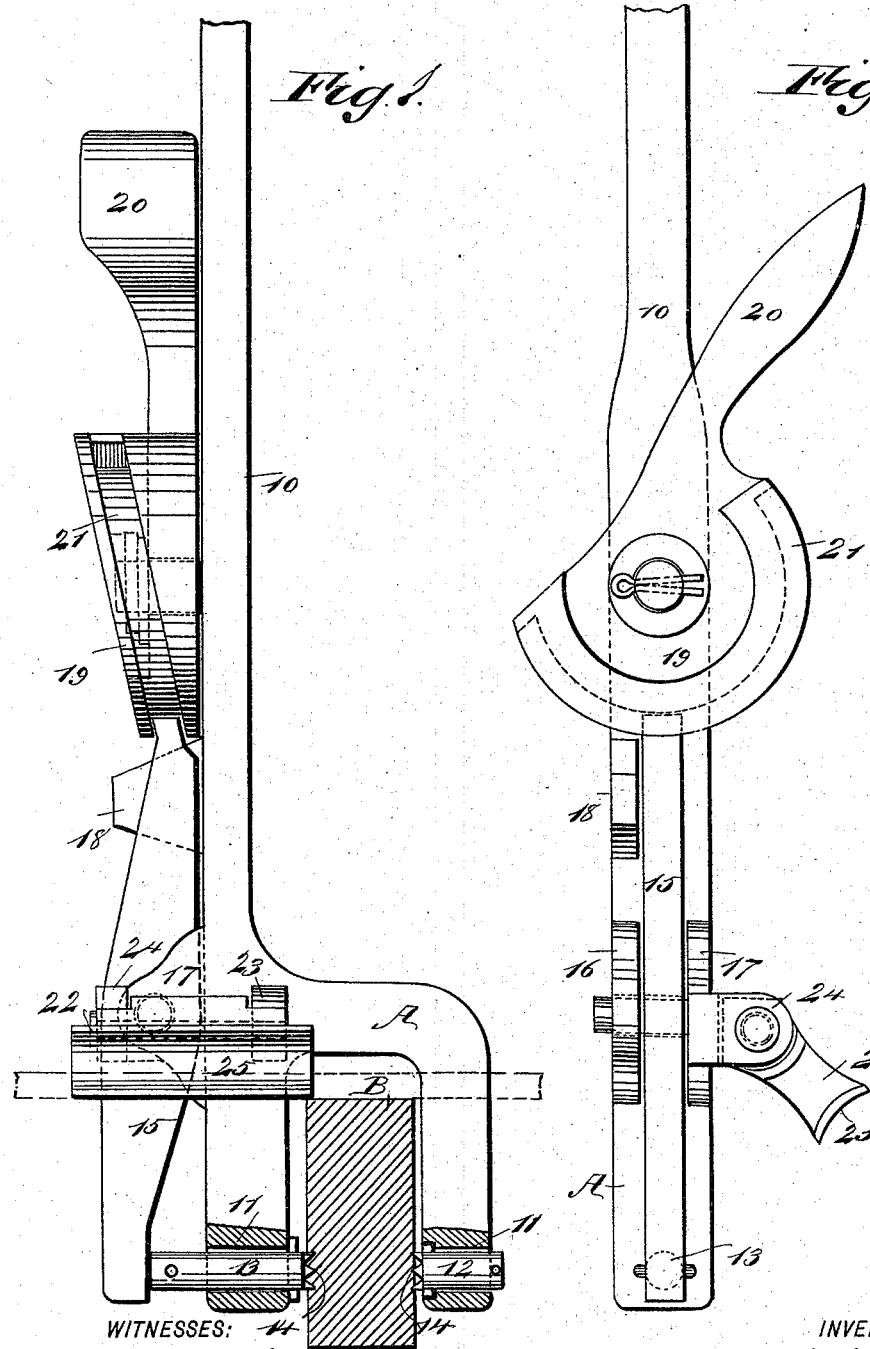

UNITED STATES PATENT OFFICE.

MOSES SCHLATTER, OF INMAN, KANSAS.

FLOOR-CLAMP.

SPECIFICATION forming part of Letters Patent No. 528,033, dated October 23, 1894.

Application filed January 30, 1894. Serial No. 498,474. (No model.)

*To all whom it may concern:*

Be it known that I, MOSES SCHLATTER, of Inman, in the county of McPherson and State of Kansas, have invented a new and Improved Floor-Clamp, of which the following is a full, clear, and exact description.

My invention relates to a floor clamp or jack, and it has for its object to provide a device through the medium of which flooring boards, or boards for siding or ceiling, may be brought together and held in close contact while they are being nailed or screwed to place as occasion may demand; and a further object of the invention is to provide a jack or clamp especially adapted for laying floors and which will be exceedingly simple, durable and economic in its construction.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1 is a front elevation of the clamp or jack, illustrating it as attached to a floor beam; and Fig. 2 is a side elevation of the same.

The body A of the clamp or jack is shaped substantially as an inverted U, and a handle 10, is located at one side of the body, which handle is practically a continuation of one of the body members. The handle may constitute an integral portion of the body or it may be attached thereto, as in practice it may be found most desirable. In the free end of each member of the body a stud is located, the said studs being free to turn in the sockets 11, made to receive them. The studs are designated respectively as 12 and 13. The stud 13, is located in what may be termed the handle member of the body, and is longer than the opposing stud 12. The two studs are in transverse alignment, and the inner end of each stud is properly a head, and the head of the stud is provided with any desired number of spurs or teeth 14, adapted to enter into any object that may be placed between the studs. The studs are limited in their movement in both directions, inward and outward; and the longer stud 13 at its outer end is connected with one end of a lever 15. The said lever is pivoted between ears 16 and 17, as shown in Fig. 2, located upon one side face of the body at its junction with the handle. The lever is prevented from moving laterally in one direction through the medium of a stay block 18, and the lever is rocked upon its pivot in such a manner as to force the stud 13 toward or from the opposing stud 12, the rocking being accomplished through the medium of a cam 19, pivoted upon the handle 10 of the device and provided with a handle 20 also. The cam is segmental, and its cylindrical surface faces the free end of the lever 15, and the said cylindrical surface of the cam is provided with a spiral cam race 21, shown in Fig. 1, into which the free end of the lever 15 is somewhat loosely fitted. Thus by rocking the cam upon its pivot, when the free end of the lever reaches the lower end of the cam groove, the end of the lever carrying the stud 13 is carried outward from the body and the stud carried away from the opposing stud 12, enabling an object to be entered into the space between the members of the body; and when an object has been so placed in the body, by moving the cam to carry the end of the lever at the higher portion of its cam groove, the stud 13 will be forced against the object located in the body, and the said object will be clamped between the two studs, the teeth burying themselves in the object. Thus while the studs serve to anchor the device to a given object they likewise serve as pivots for the body.

A jaw 22, is pivoted upon the front face of the body, and bearings 23 and 24 to which the pivotal attachment of the jaw is effected, are located one for example on the ear 17 serving as a bearing for the lever 15, and the other upon what has been termed the handle member of the body, as shown in Fig. 1.

In the operation of laying a floor for example, the cam 19 is manipulated to bring the free end of the lever 15 to the part of the cam race 21 which is nearest to the handle 10, and thereby draw one toothed stud from the other, and a floor beam B, is then made to enter between the members of the body, as shown in Fig. 1, the handle being held away from the operator at any necessary inclination, the operator facing the device. The cam 19, is next manipulated to force the lower end of the lever in direction of the body, and thus force the teeth 14 of the two studs 12 and 13 into the beam. The body may now be rocked upon the studs, and the front face 25 of the jaw 22, which face is concave, is made to engage with the tongue of the board to be forced to place; and by drawing the handle toward the operator such pressure may be brought to bear upon the board that with but little exertion the board may be forced to place and held while it is being nailed to the beam. The device is then carried to the next beam and operated as before.

Having thus described my invention, I claim as new and desire to secure by Letters Patent—

1. A floor clamp, comprising a body consisting of two rigidly connected members, opposing studs held in the members of the body and movable the one toward and from the other, means for moving one of the studs relatively to the other, and a pivoted clamping jaw arranged to swing in a plane that is essentially perpendicular to the path of travel of the said stud, substantially as described.

2. A floor clamp, comprising a body consisting of two rigidly connected members of which one is a handle member, opposing studs held in the said members of the body and movable the one toward the other, a lever pivoted to the body and connected to one of the studs, a cam secured to the body and engaging the said lever to rock it on its pivot, and a jaw pivoted to the body and arranged to swing in a plane that is essentially perpendicular to the path of travel of the stud connected to the lever, substantially as described.

3. A floor clamp, comprising a body consisting of two rigidly connected members, opposing toothed studs arranged in the members of the body, one of the studs being held to turn in its member, and the other being held to turn and slide in the opposite member, and means for actuating the sliding stud, substantially as described.

MOSES SCHLATTER.

Witnesses:
J. A. WELCH,
G. H. WELCH.